United States Patent
Wang et al.

(10) Patent No.: US 11,507,537 B2
(45) Date of Patent: Nov. 22, 2022

(54) METHOD, APPARATUS AND COMPUTER STORAGE MEDIUM FOR FILE STORAGE

(71) Applicant: EMC IP Holding Company LLC, Hopkinton, MA (US)

(72) Inventors: Donglei Wang, Beijing (CN); Zhiqiang Li, Beijing (CN); Lei Gao, Beijing (CN); Weibing Zhang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 626 days.

(21) Appl. No.: 16/223,727

(22) Filed: Dec. 18, 2018

(65) Prior Publication Data

US 2019/0332581 A1  Oct. 31, 2019

(30) Foreign Application Priority Data

Apr. 28, 2018  (CN) .......................... 201810397986.9

(51) Int. Cl.
*G06F 16/17* (2019.01)
*G06F 3/06* (2006.01)

(52) U.S. Cl.
CPC .......... *G06F 16/1727* (2019.01); *G06F 3/061* (2013.01); *G06F 3/067* (2013.01); *G06F 3/0608* (2013.01); *G06F 3/0631* (2013.01); *G06F 3/0643* (2013.01)

(58) Field of Classification Search
None
See application file for complete search history.

(56) References Cited

U.S. PATENT DOCUMENTS

| | | | | |
|---|---|---|---|---|
| 5,394,445 | A | * | 2/1995 | Ball .................... H04M 1/57 379/130 |
| 5,809,516 | A | * | 9/1998 | Ukai ..................... G06F 3/061 711/113 |
| 6,041,323 | A | * | 3/2000 | Kubota ............... G06F 16/3341 |
| 7,935,283 | B2 | | 5/2011 | Tam et al. |
| 8,478,731 | B1 | | 7/2013 | Throop et al. |
| 8,976,636 | B1 | | 3/2015 | Martin et al. |
| 9,244,618 | B1 | | 1/2016 | Martin et al. |
| 9,348,761 | B1 | | 5/2016 | Cummins et al. |
| 9,575,851 | B1 | | 2/2017 | Natanzon et al. |
| 9,619,149 | B1 | | 4/2017 | Cummins et al. |
| 9,619,264 | B1 | | 4/2017 | Natanzon et al. |
| 9,639,383 | B1 | | 5/2017 | Natanzon |
| 9,658,929 | B1 | | 5/2017 | Natanzon et al. |
| 9,659,074 | B1 | | 5/2017 | Natanzon et al. |
| 9,841,901 | B1 | | 12/2017 | Armangau et al. |
| 9,946,465 | B1 | | 4/2018 | Martin et al. |
| 10,095,425 | B1 | | 10/2018 | Martin |
| 10,346,064 | B1 | | 7/2019 | O'Hare et al. |
| 10,430,376 | B1 | | 10/2019 | Armangau et al. |
| 2004/0015478 | A1 | * | 1/2004 | Pauly .................. G06F 16/2272 |
| 2005/0188164 | A1 | * | 8/2005 | Ballantyne ............ G06F 12/126 711/159 |

(Continued)

*Primary Examiner* — Wilson Lee
(74) *Attorney, Agent, or Firm* — BainwoodHuang

(57) ABSTRACT

Techniques perform file storage. Such techniques involve determining a candidate allocation unit (AU) size for storing data based on a statistic of an AU size matching with a write request during a statistic period, and storing a new file using the determined candidate AU size to store the new file. Accordingly, storage space is saved and reading and writing performance are improved.

25 Claims, 3 Drawing Sheets

(56) References Cited

U.S. PATENT DOCUMENTS

| | | | |
|---|---|---|---|
| 2006/0212625 A1 | 9/2006 | Nakagawa et al. | |
| 2006/0224853 A1* | 10/2006 | Shimazaki | G06F 3/0631 |
| | | | 711/171 |
| 2008/0172525 A1 | 7/2008 | Nakamura et al. | |
| 2011/0153962 A1* | 6/2011 | Ozceri | G06F 21/10 |
| | | | 711/155 |
| 2011/0167239 A1* | 7/2011 | Horn | G06F 16/17 |
| | | | 711/171 |
| 2012/0124285 A1* | 5/2012 | Soran | G06F 3/0665 |
| | | | 711/114 |
| 2012/0131293 A1 | 5/2012 | Benhase et al. | |
| 2014/0188819 A1* | 7/2014 | Bagal | G06F 16/1748 |
| | | | 707/692 |
| 2014/0229675 A1 | 8/2014 | Aizman et al. | |
| 2014/0279849 A1* | 9/2014 | Zhang | G06F 16/22 |
| | | | 707/609 |
| 2014/0337576 A1* | 11/2014 | Burton | G06F 3/0649 |
| | | | 711/114 |
| 2015/0089138 A1* | 3/2015 | Tao | G06F 3/0643 |
| | | | 711/119 |
| 2015/0095909 A1* | 4/2015 | Li | G06F 9/45558 |
| | | | 718/1 |
| 2015/0124596 A1* | 5/2015 | Liu | H04L 47/822 |
| | | | 370/230 |
| 2016/0350021 A1 | 12/2016 | Matsushita et al. | |
| 2017/0103356 A1 | 4/2017 | Sabloniere | |
| 2017/0177248 A1* | 6/2017 | Malygin | G06F 3/0644 |
| 2018/0081816 A1* | 3/2018 | Coburn | G06F 12/0868 |
| 2018/0300905 A1* | 10/2018 | Johnston | H04N 19/137 |
| 2019/0005072 A1 | 1/2019 | Kvalnes | G06F 16/288 |
| 2019/0303002 A1* | 10/2019 | Frolikov | G06F 3/0634 |

\* cited by examiner

METHOD, APPARATUS AND COMPUTER STORAGE MEDIUM FOR FILE STORAGE

FIELD

Embodiments of the present disclosure generally relate to the technical field of data storage, and more specifically, to a method, an apparatus and a computer storage medium for file storage.

BACKGROUND

This section introduces aspects that may facilitate better understanding of the disclosure. Accordingly, the statements of this section are to be read in this light and are not to be understood as admissions about what is in the prior art or what is not in the prior art.

In a file system (FS), an allocation unit (AU) is the smallest unit for file data storage allocation. Usually, the size of the allocation unit is fixed for a specific file system and is set when a new file system is created, in addition, it cannot be changed any more during the life cycle of the file system. If the AU can be well chosen and most of the input/outputs (I/Os) are AU-aligned, the file system can provide the optimal performance and make best use of the disk space.

SUMMARY

The present disclosure provides methods, apparatuses and computer storage medium for file storage.

In a first aspect of the present disclosure, there is provided a method for file storage, including: determining a candidate allocation unit (AU) size for storing data based on a statistic of an AU size matching with a write request during a statistic period, and storing a new file by using the determined candidate AU size in a process of creating the new file.

In some embodiments, the method may further include obtaining the statistic of the AU size matching with the write request by: determining, for each of write requests received during the statistic period, an AU size matching with the write request from a predetermined set of AU sizes; and making statistics of a matching probability between each AU size in the predetermined set of AU sizes and the write requests.

In another embodiment, making statistics of the matching probability between each AU size in the predetermined set of AU sizes and the write requests may include: making statistics of the number of write requests matching with each AU size in the predetermined set of AU sizes, or making statistics of a ratio between the number of write requests matching with each AU size in the predetermined set of AU sizes and a total number of the write requests.

In some embodiments, determining, for each of write requests received during the statistic period an AU size matching with the write requests from a predetermined set of AU sizes may include: determining, for each of the write requests, a start position and a length to be written; and selecting, from the predetermined set of AU sizes, a maximum AU size exactly divisible by both the start position and the length as an AU size matching with the write request.

In some other embodiments, determining the candidate AU size for storing data may include: in response to a maximum matching probability among the matching probabilities exceeding a matching threshold, determining an AU size having the maximum matching probability as the candidate AU size; and in response to the maximum matching probability among the matching probabilities being less than the matching threshold, determining a default AU size as the candidate AU size.

In still some other embodiments, the method may further include: obtaining a total number of write requests received during the statistic period.

In some embodiments, determining the candidate AU size may include: in response to the total number of the write requests exceeding a total number threshold, determining an AU size having a maximum matching probability in the predetermined set of AU sizes as the candidate AU size; and in response to the total number of the write requests being less than the total number threshold, determining a default AU size as the candidate AU size.

In some other embodiments, determining the candidate AU size may include: in response to a maximum matching probability among the matching probabilities exceeding a matching threshold and a total number of the write requests exceeding a total number threshold, determining an AU size having the maximum matching probability as the candidate AU size; and in response to the maximum matching probability being less than the matching threshold and/or a total number of the write requests being less than the total number threshold, determining a default AU size as the candidate AU size.

In some embodiments, the method may further include: in response to that the determined candidate AU size is different from a default AU size or a currently used AU size, sending a notification to a user.

In some other embodiments, the statistic period is periodic and storing the new file by using the determined candidate AU size includes: storing the new file by using a candidate AU size determined based on the statistic during the latest statistic period.

In some embodiments, a length of the statistic period is not smaller than a predetermined threshold length.

In some other embodiments, the method may further include: writing the candidate AU size into a file index of the new file in the process of creating the new file.

In still some other embodiments, the method may further include: detecting configuration information from a user; and wherein storing the new file by using the determined candidate AU size may include: in response to the configuration information indicating that an automatic selection function of the AU size if enabled, storing the new file by using the determined candidate AU size.

In a second aspect of the present disclosure, there is provided a device includes at least one processor and at least one memory with computer program codes stored thereon. The at least one memory and the computer program codes are configured with the at least one processor, to cause the device at least to implement the method described in the first aspect of the present disclosure.

In a third aspect of the present disclosure, there is provided a computer program product including instructions which, when executed on one or more processors, cause any method according to the first aspect of the present disclosure to be performed.

In a fourth aspect of the present disclosure, there is provided a computer readable storage medium with a computer program stored thereon. The computer program, when executed on at least one processor, causes any method according to the first aspect of the present disclosure to be performed.

BRIEF DESCRIPTION OF THE DRAWINGS

Some example embodiments of the present disclosure will be depicted below with reference to the accompanying drawings. In the drawings, the same reference symbol represents the same or equivalent elements. The drawings are used only for facilitating better understanding of the embodiments of the present disclosure and are not necessarily drawn to scale, in which.

DETAILED DESCRIPTION OF EMBODIMENTS

Figure 1:
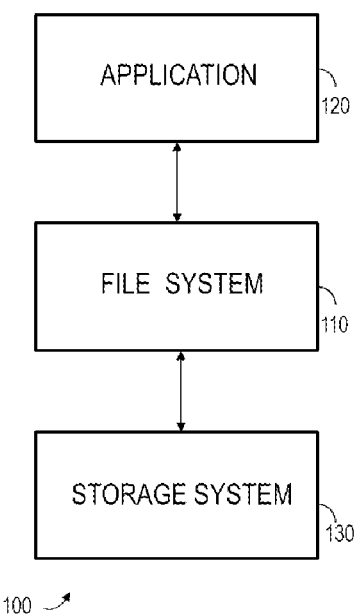
FIG. 1 is a schematic diagram illustrating relationship between a file system, a user application and a storage system.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

It is to be understood that all these embodiments of the present disclosure are given merely for one skilled in the art to better understand and further practice the present disclosure, but not for limiting the scope of the present disclosure. For example, features illustrated or described as part of one embodiment may be used with another embodiment to yield still a further embodiment. In the interest of clarity, some features of actual implementations described in this specification may be omitted.

References in the specification to "one embodiment," "an embodiment," "an example embodiment," and the like indicate that the embodiments described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is understood that it is within the knowledge of one of ordinary skilled in the art to combine such feature, structure, or characteristic with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to limit the example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof. The term "optionally" means that the embodiments or implementation described herein are not mandatory but may be omitted in some cases.

A file system may be considered as an interface between a user and a storage system for managing storage space. FIG. 1 is a schematic diagram illustrating a relationship between a file system 110, a user application 120 and a storage system 130. As shown in FIG. 1, the file system 110 may receive an input/output (I/O) request from the application 120 and read data from or write data to the storage system 130 based on the I/O request.

For each received write request, the FS needs to allocate storage space. In a file system, an AU is the smallest allocation unit for data storage of a file. For each received write request, if the write request is associated with a portion of the file that is not allocated with storage space, the file system needs to allocate at least one AU for it. Typically, the size of AU is set when a new file system is created and cannot be changed any more during the life cycle of the file system.

Figure 2:
FIG. 2 illustrates an example for processing a small write request using a fixed AU size.

It has been realized by the inventor of the present disclosure that the configuration of existing AU has several problems. For example, an AU with fixed size may cause a waste of storage space. FIG. 2 illustrates an example for storage allocation in a file system with an AU size of 16 KB. In this example, it is assumed that the IO request received by the FS is a small (namely, request to write a small amount of data) write request. For example, an user wants to create a new file and write 1 KB data therein. The file system will allocate at least 16 KB storage space to the write operation because the AU of the FS is 16 KB. If the user does not add write operations to the file again, the left 15 KB storage in the allocated storage space will be wasted. Moreover, when the user needs to read this 1 KB data, he/she has to read the entire 16 KB AU. Thus, when a fixed AU size is utilized to serve a small IO operation (namely, an IO operation involving a small amount of data), it may cause a waste of the storage space and low efficiency of the IO operation.

Figure 3:
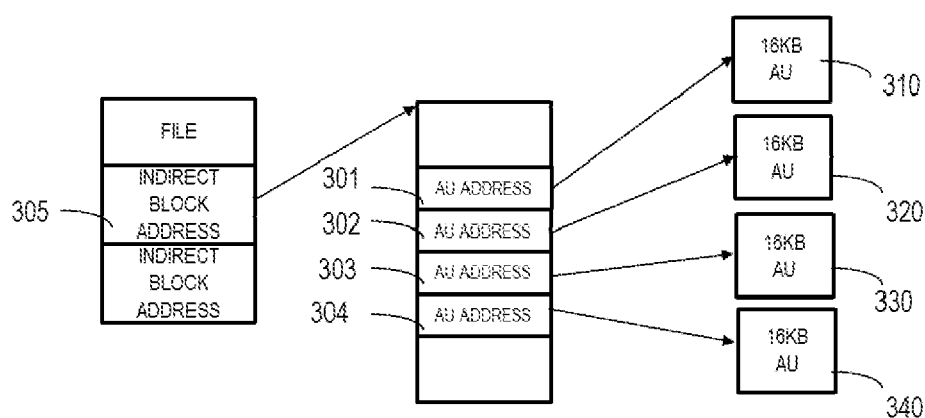
FIG. 3 illustrates an example for processing a large write request using a fixed AU size.

Moreover, when a fixed AU size is used to serve a large IO operation (namely, an IO operation involving a large amount of data), it may result in additional metadata and an increase of the necessary storage space. FIG. 3 schematically illustrates another example for storage allocation in an FS with an AU size of 16 KB. In this example, it is assumed that the FS receives a new write request for 64 KB data.

Then, the FS needs to allocate four AUs 310-340 and four pointers 301-304 for the write to store address mapping information thereof.

Likewise, if an FS receives a new 1 MB write request, the FS needs to allocate 64 AUs and 64 pointers to store the address mapping information which may be indicated by direct pointers or indirect pointers. The number of direct pointers is limited and the indicated address range is also limited. Therefore, if the FS is allocated with a relatively large number of AUs and it is not in the address range indicated by the direct pointers, it is necessary to use indirect pointers for indication. The indirect pointers point to the addresses of indirect blocks in which the addresses of the data are stored. The direct pointers and indirect pointers may be stored as metadata in the file index (for instance, Inode) of the file. For example, as shown in FIG. 3, the indirect pointer 305 in Inode points to the indirect block 350 storing AU address pointers 301-304.

Thus, when a fixed AU size is used to serve a large IO, the FS might need to allocate a large number of AUs and address pointers and may cause allocation of extra indirect blocks. If the write request crosses indirect blocks, then the number of indirect blocks to be allocated will further increase, which causes the increase of metadata and the increase of occupancy for storage resources, that is, the overhead for obtaining the mapping information increases.

In addition, a fixed AU size also impacts processing efficiency for read requests. For example, in the example shown in FIG. 3, when 64 KB data is read, the FS needs to check all the four pointers 301-304 and might need to read several extra indirect pointers (such as the indirect pointer 305 shown in FIG. 3) to obtain the mapping information.

As can be seen from the above example, if a user utilizes an improper AU size in the FS, it may result in waste of the storage space. Moreover, when the AU size and IO are not matching (the size of IO request is smaller than the AU size or the request is not aligned with the size of AU), compared with the condition when they are matching, to process IO of the same length, the FS might need to read/allocate more metadata blocks, which causes IO performance degradation, because the file system needs to process additional IOs for the metadata.

In many cases, a file system generally needs to support a plurality of applications at the same time, and each of the plurality of applications which might use different IO sizes. Therefore, there is a high rate that the size of AU is not matching with that of IO.

To provide better user experience, one solution is to choose a more suitable AU size. However, when AU size is changed, to keep user data, customers need to migrate the current file system to a new file system. The migration is usually very slow and may block new incoming IOs. Moreover, if there is a large amount of data on the source file system, then the operation would possibly impact the production system. Therefore, the solution is very costly and might not be feasible for the customer.

The present disclosure provides a new solution for improving file storage. In some embodiments, there is provided a scheme for adaptive file-level AU size selection. In the scheme, the size of AU may be selected automatically for a file based on internal IO statistic data. As such, it is possible to use different AU sizes for different files in the same file system, thereby improving IO performance, better utilizing storage space and avoiding the requirement for migrating the file system upon occurrence of AU mismatch.

In some embodiments, an administrator may configure a default AU size and AU adjustment policy which is used for guiding when and how to adjust the optimal AU size of the file. The administrator does not need to worry about supporting different applications and IO patterns, because the file system can choose the optimal AU size for the file automatically based on the policy.

Figure 4:
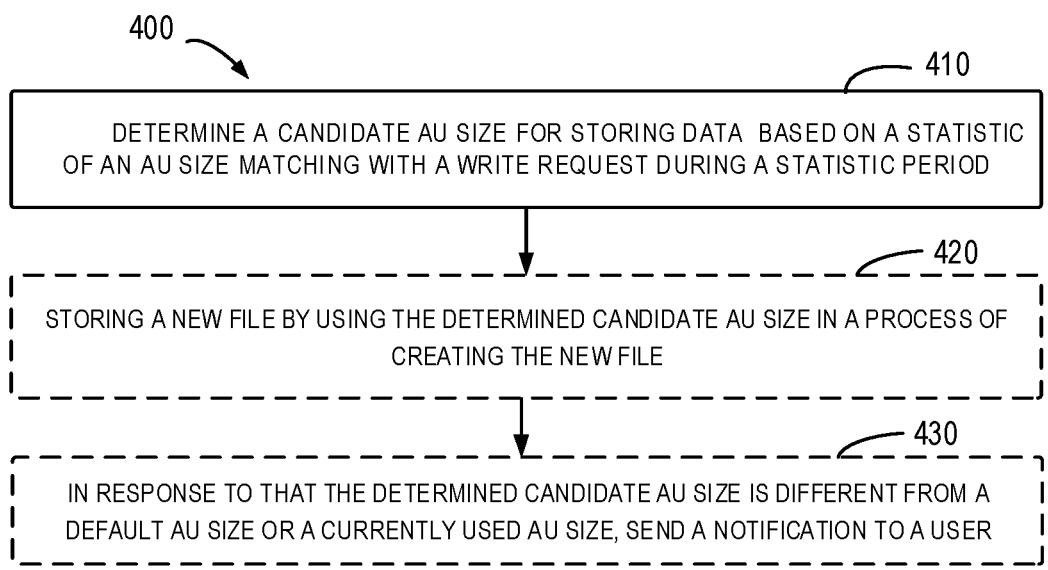
FIG. 4 is a flowchart illustrating a method for file storage based on statistic data according to some embodiments of the present disclosure.

FIG. 4 illustrates an operation of an example method 400 for selecting AU size automatically for the file based on IO statistic data according to some embodiments of the present disclosure. The method, for instance, may be implemented by the file system 110 shown in FIG. 1. For ease of depiction, the method 400 will be described with reference will to FIG. 1 as below.

As shown in FIG. 4, at block 410, the FS 110 determines (or ascertains), based on a statistic of an AU size matching with a write request during the statistic period, a candidate AU size for data storage. In accordance with certain embodiments, such identification of the candidate AU size involves outputting a result indicating the candidate AU size.

In some embodiments, the statistic may be obtained by FS 111 from other devices. In some other embodiments, the statistic may be executed by the FS 111 itself.

By way of example rather than for limitation, FS 111 may receive write requests during the statistic period and obtain the statistic of the AU size matching with the write request during the statistic period. In some embodiments, one reason for only making statistics for the write request is that the read requests will not cause AU allocation, thus having smaller influence on the storage space.

In some embodiments, it is possible to record and make statistics of information of all the write requests received during the statistic period in FS 110. To obtain precise statistic data about the received write requests, the statistic entrance may be put somewhere on IO stack where client IO has been decoded and before any aggregation/resizing/compression happens. For example, it is suitable to make statistics of IOs at the FS layer. In some FSs, there exists a common IO interface layer (such as virtual FS (VFS) layer). In this case, a simple solution is to configure the statistic entrance at the common IO interface layer (for example, add the IO size checking and IO counter to the VFS layer).

By way of example rather than limitation, in some embodiments, the statistic include information related to at least one of the length and the start position (also referred to as "offset amount" herein) of the data to be written by the received write request. In some embodiments, the statistic data includes statistic of the AU size matching with the write request.

Figure 5:
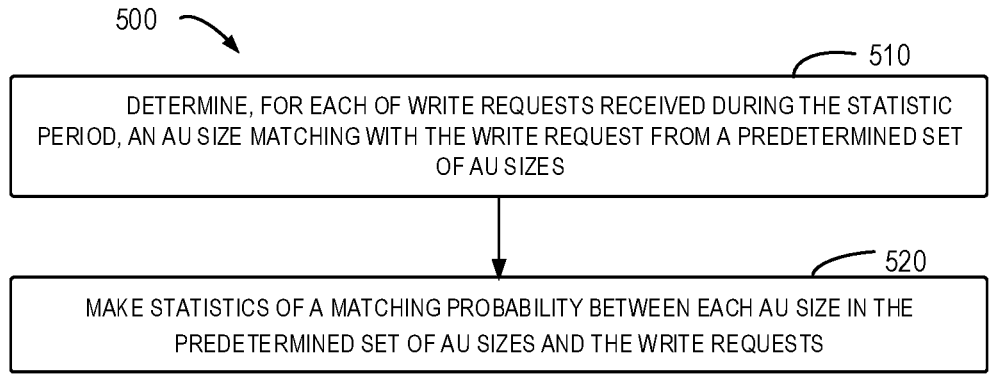
FIG. 5 illustrates an operation of obtaining the statistics of AU sizes matching with write requests according to some embodiments of the present disclosure.

FIG. 5 illustrates an example operation 500 performed by the FS 110 or other devices for obtaining the statistic of an AU size matching with a write request according to some embodiments of the present disclosure. The statistic may be used by the FS 110 in block 410 shown in FIG. 4 for determining the candidate AU size. For ease of depiction, the example operation 500 will be described with reference to the FS 110.

As shown in FIG. 5, at block 510, FS 110 determines, for each of write requests received during the statistic period, an AU size matching with the write request from a predetermined set of AU sizes. The predetermined set of AU sizes may include, for instance, AU sizes of 8 KB, 16 KB, 32 KB, 64 KB, 128 KB and 1 MB. However, it is to be understood that the embodiments of the present disclosure are not limited to any specific set of AU sizes. The set, for instance, may be configured based on the application type supported by the file system 110.

In some embodiments, the FS 110 may determine the AU size matching with the write request based on the length and the start position of the data to be written by the write request. A too large AU may cause a waste of the storage space while a too small AU may result in an increase of the metadata. Therefore, in some embodiments, it is possible to take the maximum AU size exactly divisible by both the start position (also referred to as offset amount herein) and the length of the data to be written as the AU size matching with the write request.

For example, if the predetermined set of AU sizes S={8 KB, 16 KB, 32 KB, 64 KB, 128 KB, 1 MB} and the offset amount of data to be written by an IO request is 512 KB, and the length thereof is 64 KB, then the IO request is aligned with the AU size 64 KB. In other words, 64 KB is considered as the AU size matching with the IO request.

For another example, if the offset amount of data to be written by an IO request is 32 KB and the length thereof is 24 KB, then the IO is aligned with the AU size 8 KB. That is, 8 KB is considered as the AU size matching with the IO request.

If an IO request cannot be aligned with any of the AU sizes supported by the system (for example, in the predetermined set of AU sizes), then the IO request is considered as an unaligned IO. For example, if the offset amount of data to be written by an IO request is 12 KB, and the length thereof is 8 KB, then the IO cannot be aligned with any AU size in {8 KB, 16 KB, 32 KB, 64 KB, 128 KB, 1 MB} and is referred to as unaligned IO. Similarly, if the offset amount of data to be written by an IO request is 8 KB, and the length thereof is 1 KB, then the IO is also impossible to be aligned with any AU size in the predetermined set of AU sizes, and thus is also considered as unaligned IO.

At block 520, FS 111 may make statistics of a matching probability between each AU size in the predetermined set of AU sizes and the write requests. By means of example rather for limitation, the matching probability may include the number of write requests matching with each AU size in the predetermined set of AU sizes, or a ratio (for instance, percentage) of the number of write requests matching with each AU size in the predetermined set of AU sizes with respect to the total number of write requests.

In some embodiments, a counter may be configured for each AU size in the predetermined set of AU sizes to make statistics of the matching probability of the AU size. In some embodiments, the FS 111 may also make statistics of the probability of receiving unaligned IOs. For example, in the embodiments where the predetermined set of AU sizes is S={8 KB, 16 KB, 32 KB, 64 KB, 128 KB, 1 MB}, counters may be configured for the six AU sizes in the set respectively to make statistics of their probabilities of matching with the write requests, and an additional counter is configured to make statistics of the number of unaligned IOs or a ratio of unaligned IOs in the total number of IOs.

In some embodiments, an IO counter array may be configured for the above statistics for each file system. The counter array is not necessarily to be kept on the disk but can be retained in the memory, because it will be changed when there is a new write. By way of example rather than for limitation, it is possible to store the counter array by an array including a plurality of elements. For example, the counter array may be defined with the following structure:

```
struct supper_block { // supper block for FS
    u_short default_block;   // the default AU size
    u_short suggested_fs_block;   // the suggested AU size, this field can be updated dynamically
};
```

```
struct dinode {    // the inode structure for the file
    u_short block_size;    // the AU size for this file, this will be updated to a disk
};
#define FS_BLOCK_TYPE 6
#define IO_COUNTER_CNT FS_BLOCK_TYPE + 1
enum FS_BLOCK_ALIGNED_TYPE {
    FS_BLOCK_UNALIGN = 0,
    FS_BLOCK_8KB,
    FS_BLOCK_16KB,
    FS_BLOCK_32KB,
    FS_BLOCK_64KB,
    FS_BLOCK_128KB,
    FS_BLOCK_1MB
};
class VFS_FileSystem{
...
    Ulong64 nWriteRequestSize[IO_COUNTER_CNT];
....
}
wherein
nWriteRequestSize[FS_BLOCK_UNALIGN]: the number of IOs not aligned with any AU size;
nWriteRequestSize[FS_BLOCK_8KB]: the number of IOs aligned with 8KB AU;
nWriteRequestSize[FS_BLOCK_16KB]: the number of IOs aligned with 16KB AU;
nWriteRequestSize[FS_BLOCK_32KB]: the number of IOs aligned with 32KB AU;
nWriteRequestSize[FS_BLOCK_64KB]: the number of IOs aligned with 64 KB AU;
nWriteRequestSize[FS_BLOCK_128KB]: the number of IOs aligned with 128 KB AU;
nWriteRequestSize[FS_BLOCK_1MB]: the number of IOs aligned with 1MB AU;
```

The counter array for each file system may consume, for instance, 56 bytes. Thus, even if there are hundreds of file systems, the total memory consumption of the counter array will not be too large. Hence, the memory consumption incurred by the statistics is acceptable.

In some embodiments of the present disclosure, FS 110 checks each received write request to obtain statistic data. For example, as depicted with reference to FIG. 5, the FS 110 may determine if the write request is aligned with a certain AU size (namely, determine the AU size matching with the write request) in a predetermined set of AU sizes based on both the offset amount and the length in the write request and update the counter on this basis.

For example, if the offset amount of the incoming IO request is 512 KB, and the length thereof is 64 KB, then the IO is aligned with the AU size 64 KB. Therefore, the counter of the IO matching with the 64 KB AU size is added by 1. Likewise, if the offset amount of the incoming IO request is 32 KB and the length thereof is 24 KB, then the IO is aligned with an AU size of 8 KB. Therefore, the counter of the IO aligned with the 8 KB AU size is added by 1.

As depicted above, if the IO request cannot be aligned with any size supported by the system, then the IO is considered as an unaligned IO. In some embodiments, if an unaligned IO is received, then the corresponding counter adds 1. For example, if the offset amount of the incoming IO request is 12 KB and the length thereof is 8 KB, then the IO cannot be aligned with any AU size in the predetermined set S. Therefore, the counter of the unaligned IOs is added by 1. Similarly, if the offset amount of the incoming IO request is 8 KB and the length is 1 KB, then the IO cannot be aligned with any AU size in the predetermined set S either. Therefore, the counter of the unaligned IOs is added by 1.

In some embodiments, it is possible to take the count (the number of IOs aligned/matching with each AU size) in the counter as statistic data for determining a candidate AU size in the block 410 shown in FIG. 4. In some other embodiments, the statistic data used in block 410 may be obtained by processing the counts in the counters. For example, the percentage of IOs aligned with each of the AU sizes may be calculated based on the number of IOs aligned/matching with each AU size. That is, the percentage $R_k$ of IOs aligned with the $k^{th}$ AU size may be calculated as follows:

$$R_k = \frac{N_k}{N_{tot}} \times 100\% \quad (1)$$

Where $N_k$ represents the number of IOs aligned with the $k^{th}$ AU size and $N_{tot}$ represents the total number of the received IOs. As a matter of fact, both the count value $N_k$ and the calculated percentage $R_k$ can be used to represent the probability that each of the AU sizes is matching.

Table 1 shows an example of the percentage of IOs aligned with each AU size obtained based on the counts in the counter.

TABLE 1

Percentage of IOs aligned with each AU size

| AU size(KB) | Percentage (%) |
|---|---|
| unaligned | 2 |
| 8 | 3 |
| 16 | 0 |
| 32 | 81 |
| 64 | 4 |
| 128 | 6 |
| 1024 | 4 |

The counters are only used for recording runtime IO statistic data which are used to select a more suitable AU size for a new file. However, such data might be unimportant for other operations of the system. Therefore, the counters may be stored in the memory rather than being kept in the disk.

Referring to FIG. 4 again, in some embodiments, at block 410, it is possible to compare the matching probability (such as $N_k$ or $R_k$) between each of the AU sizes and the write requests and select the AU size with the greatest matching probability directly as the candidate AU size. For example, if the matching probability of each AU size is as shown in Table 1, then the 32 KB with the greatest matching probability (81%) may be determined as the candidate AU size.

In some embodiments, the candidate AU size may be further determined based on the predetermined matching probability and/or criteria. For example, if the maximum matching probability among the matching probabilities of each of the AU sizes exceeds a matching threshold T1 (for example, but not limited to, 80%), then the AU size with this maximum matching probability may be determined as the candidate AU size. Under this condition, the AU size with this maximum matching probability is considered as the most suitable AU size during the statistic period. In other words, the size of the incoming client IO during this statistic period is almost aligned with the size of the AU. In the example shown in Table 1, the number of IOs aligned with 32 KB AU size accounts for 81% of the total, exceeding the predetermined threshold 80%. Therefore, it may be considered that 32 KB is the most suitable AU size during this statistic period. The most suitable AU size obtained in this way or the suggested AU size may be taken as the candidate AU size and be updated to a superblock in the FS 110. In addition, the superblock may further contain a default AU size, the type of the file system and so on.

On the other hand, in some embodiments, if the maximum matching probability among the matching probabilities is less than the matching threshold T1, the default AU size may be determined as the candidate AU size. This is because in this condition, it can be considered that there does not exist a certain AU whose size is aligned with the majority of the incoming IOs.

It has been realized by the inventor of the present disclosure that under some conditions, the number of IO requests during a statistic period might be small. As such, the statistic result during this period may fail to reflect the actual usage condition of the file system. Therefore, a wrong candidate AU size might be obtained based on the statistic result during this statistic period. In some embodiments, it is possible to ensure a sufficient number of IO requests by setting a suitable length of static period. For example, the statistic period may be configured to be longer than a predetermined threshold length (e.g., 24 hours).

Alternatively or additionally, in some embodiments, to avoid a wrong statistic result or wrong candidate AU size, it is possible to introduce another total number threshold T2 to check if the statistic result of the statistic period should be updated to the superblock. For example, optionally, the FS 110 may make statistics of the total number of write requests received during the period. Besides, at block 410, the FS 110 may further determine the AU size of a candidate allocation unit for storing data by comparing the total number of write requests with the total number threshold T2.

By means of example rather than for limitation, if the total number of write requests exceeds the total number threshold, the statistics are considered to be accurate, and the FS 111 may determine, at block 410, the AU size with the maximum matching probability in the predetermined set of AU sizes as the candidate AU size. On the other hand, if the total number of the write requests is less than the total number threshold, then the FS 111 may determine the default AU size as the candidate AU size at block 410.

Alternatively, the AU size of the candidate allocation unit may be determined based on both the matching threshold T1 and the total number threshold T2. For example, if the maximum matching probability among the matching probabilities exceeds the matching threshold T1 and the total number of write requests exceeds the total number threshold T2, then the FS 110 may determine the AU size with the maximum matching probability as the candidate AU size. On the other hand, if the maximum matching probability is less than the matching threshold T1, and/or, the total number of write requests is less than the total number threshold T2, then the FS 110 may determine the default AU size as the candidate AU size. It is to be understood that both the matching threshold T1 and the total number threshold T2 can be configured by an user.

In another embodiment, if the total number of write requests received during the statistic period is less than the total number threshold, then the result of the candidate AU size will not be updated to the superblock, that is, the candidate AU size determined in the previous period is still used, or in other words, the candidate AU size currently already stored in the superblock is used.

As shown in FIG. 4, at block 420, when creating a new file, the FS 110 utilizes the candidate AU size determined at block 410 (e.g., based on a result indicating the candidate AU size). For example, the FS 110 may use the candidate AU size at block 420 to perform file storage, that is, use the candidate AU size as the allocation unit of the file. Optionally, in some embodiments, when creating a new file, the FS 111 may write the candidate AU size into the file index of the new file.

Since the AU size determined at block 410 is calculated based on the IO statistic data during the statistic period, the probability that the incoming IO requests are matching with the candidate AU size is very high. Therefore, file storage based on the candidate AU size may obtain better IO performance and make good use of the storage space.

In some embodiments, the statistic period may be periodic. That is, the operation at block 410 in method 400 may be performed during each statistic period to update the candidate AU size dynamically. Besides, at block 420, the FS 110 uses the latest (namely, obtained during the previous statistic period) candidate AU size for file storage.

In some embodiments, at the start of each statistic period, the counters may be reset to avoid an adverse effect caused by too much old data. In some embodiments, at the expiration of the statistic period, the system updates the statistic result to the superblock and resets the counters to 0. The statistic period may be configured by an user. For example, when the file system is installed, it is possible to create a timer for the statistic period in the file system initialization path. When the timer expires each time, the system updates the statistic result to the superblock and then resets the timer to 0. If there exists a failover/failure recovery, then some history data stored during a period which is less than a statistic period will be lost. Under this condition, a new statistic period will be initiated. As the statistic data is not important for other operations of the system, the resultant lost history data will not cause serious problems, at most resulting in the degradation of the system within a period of time to the one with a fixed AU size.

Moreover, if the IO pattern in the previous statistic period is totally different from the one in the current period, then the candidate AU size determined in the previous period might be inaccurate for the current period. Under this condition, the file system is degraded to the one with a fixed AU size.

In some embodiments, an user may configure whether to activate the automatic AU size selection function. If it is activated, then it is allowed to determine the AU size of a new file being stored dynamically based on the IO statistic result. As such, it is possible to use different AU sizes for different files in the same FS. If it is not activated, the case of degrading to a fixed AU size will occur.

In some embodiments, the user may choose to disable the function of AU size automatic selection within a particular period of time, for instance, by using command lines. For example, when a system or an application program is installed/updated, the IO pattern is temporary. Therefore, the suggested AU size (namely, the candidate AU size) obtained based on the statistic data of these IOs might be inaccurate. Thus, in this case, during the period of installing/updating the system or application program, an user may deactive the function of AU size automatic selection and activate this function again after this period.

Alternatively or additionally, in some embodiments, it is possible to send an alert to the user based on the statistic result to assist the user to set the AU size. For example, when the size of the candidate AU determined at block 410 is different from and the size of the default AU or that of the currently used AU, the FS 110 may notify the user at block 430 to indicate the difference. For example, when the size of the candidate AU determined at block 410 is different from the size of the default AU, the FS may notify the administrator that there exists an AU mismatch event by sending an e-mail or changing the file system health condition, for instance. The administrator may, based on the alert message, decide to change the AU size, migrate the whole file system, change the policy to leverage a suggested AU size automatically to store files, or only to stay unchanged. This embodiment provides more options for the user.

Figure 6:
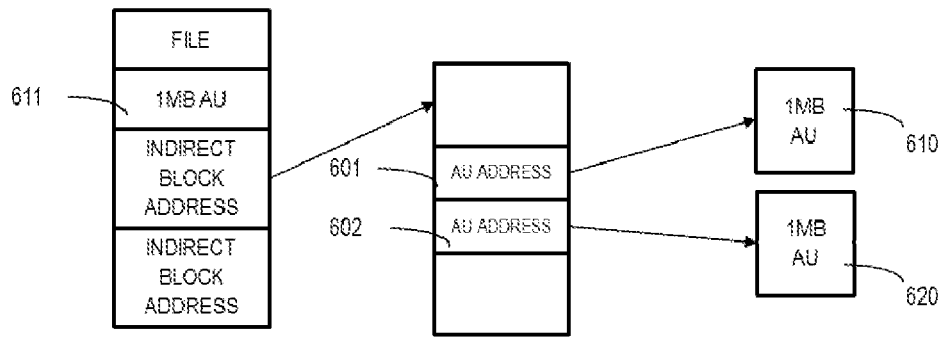
FIG. 6 illustrates an example for processing write requests based on a statistic of the size of AU according to some embodiments of the present disclosure.

FIG. 6 is a schematic diagram for executing file storage according to some embodiments of the present disclosure. In this example, it is assumed that the size of the candidate AU is determined to be 1 MB with the method shown in FIG. 4, and the received write request will create a new file and write 2 MB data. As shown in FIG. 6, under this condition, an FS 110 may write the 1 MB AU size as a field 611 into the Inode of the file and allocate two AUs 610-620 for the storage of the file. Besides, it is only necessary to allocate two AU address pointers 601 and 602 to implement mapping. Compared with the example shown in FIG. 3, the metadata storage space is reduced.

Figure 7:
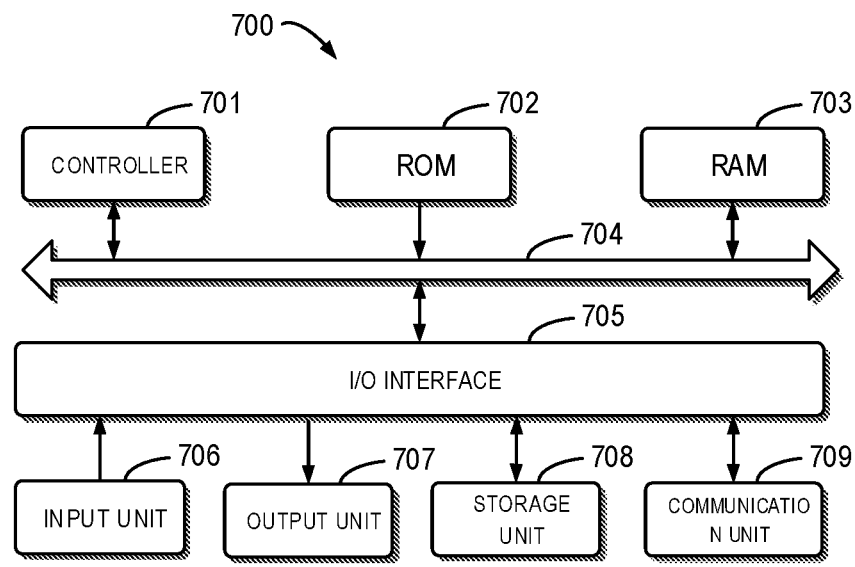
FIG. 7 shows a simplified block diagram of a device according to some embodiments of the present disclosure.

FIG. 7 illustrates a schematic block diagram of a device 700 that may be used to implement the embodiments of the present disclosure. As shown in FIG. 7, the electronic device 700 includes a controller, or referred to as a processing unit (for example, CPU) 701 which can execute various appropriate actions and processing based on the computer program instructions stored in a read-only memory (ROM) 702 and/or the computer program instructions loaded into a random access memory (RAM) 703. ROM 702 and/or RAM 703 may store all kinds of programs and data required by operating the electronic device 700. The controller 701, ROM 702 and RAM 703 are connected to each other via a bus 704, for instance. Particularly, the electronic device 700 may further include one or more dedicated processing units (not shown) which may also be connected to the bus 704.

An input/output (I/O) interface 705 is also connected to the bus 704. A plurality of components in the electronic device 700 are connected to the I/O interface 705, includes: an input unit 706, such as keyboard, mouse and the like; an output unit 707, such as various types of displays, loudspeakers and the like; a storage unit 708, such as magnetic disk, optical disk and the like; and a communication unit 709, such as network card, modem, wireless communication transceiver and the like. The communication unit 709 allows the electronic device 700 to exchange information/data with other devices through computer networks such as Internet and/or various telecommunication networks.

In some embodiments, each procedure and processing as described above, such as the method 400, can be executed by the controller 701. For example, in some embodiments, the method 400 can be implemented as computer software programs, which are tangibly included in a machine-readable medium, such as the storage unit 708. In some embodiments, the computer program can be partially or completely loaded and/or installed to the electronic device 700 via the ROM 702 and/or the communication unit 709. When the computer program is loaded to the RAM 703 and executed by the controller 701, one or more steps of the above described method 400 are implemented. Alternatively, in some other embodiments, the controller 701 may also be configured to implement the above process/method in any other proper manner.

Particularly, according to the embodiments of the present disclosure, the method and device described above with reference to FIGS. 4-7 may be implemented as computer program products which may be tangibly stored on a non-transient computer readable storage medium and include machine executable instructions which, when executed, cause the machine to implement various aspects of the present disclosure.

The computer readable storage medium can be a tangible device that can store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local region network (LAN) or a wide region network (WAN), or the connection may be made to an external computer (for example, through the Internet using an Internet Service Provider). In some embodiments, by means of state information of the computer readable program instructions, an electronic circuitry including, for example, programmable logic circuitry, field-programmable gate arrays (FPGA), or programmable logic arrays (PLA) can be personalized to execute the computer readable program instructions, thereby implementing various aspects of the present disclosure.

Aspects of the present disclosure are described herein with reference to flowchart illustrations and/or block diagrams of devices, methods and computer program products according to the embodiments of the present disclosure. It will be understood that each block of the flowchart illustrations and/or block diagrams, and combinations of blocks in the flowchart illustrations and/or block diagrams, can be implemented by computer readable program instructions.

Although the present disclosure has been described with reference to various embodiments, it is to be understood that the present disclosure is not limited to the disclosed embodiments. Without departing from the essence of the present disclosure, all the modifications and variations shall fall under the scope of the protection of the present disclosure defined by the claims.

We claim:

1. A method performed by a computing device for efficiently storing files in persistent storage, wherein the persistent storage comprises a hardware data storage device, the method comprising:
   determining a candidate allocation unit (AU) size for storing data based on a statistic of an AU size matching with a write request during a statistic period;
   obtaining the statistic of the AU size matching with the write request by:
      determining, for each of write requests received during the statistic period, an AU size matching with the write request from a predetermined set of AU sizes, and
      making statistics of a matching probability between each AU size in the predetermined set of AU sizes and the write requests; and
   storing a new file in the persistent storage by using the determined candidate AU size in a process of creating the new file, wherein the determined candidate AU size is different from a plurality of other AU sizes used for storing other files that are contained in a file system that also contains the new file, whereby utilization of storage space in the persistent storage is improved.

2. The method according to claim 1, wherein making statistics of the matching probability between each AU size in the predetermined set of AU sizes and the write requests comprises:
   making statistics of the number of write requests matching with each AU size in the predetermined set of AU sizes, or
   making statistics of a ratio between the number of write requests matching with each AU size in the predetermined set of AU sizes and a total number of the write requests.

3. The method according to claim 1, wherein determining, for each of write requests received during the statistic period, an AU size matching with the write requests from a predetermined set of AU sizes comprises:
   determining, for each of the write requests, a start position and a length to be written; and
   selecting, from the predetermined set of AU sizes, a maximum AU size exactly divisible by both the start position and the length as an AU size matching with the write request.

4. The method according to claim 1, wherein determining the candidate AU size for storing data comprises:
   in response to a maximum matching probability among the matching probabilities exceeding a matching threshold, determining an AU size having the maximum matching probability as the candidate AU size; and
   in response to the maximum matching probability among the matching probabilities being less than the matching threshold, determining a default AU size as the candidate AU size.

5. The method according to claim 1, further comprising:
   obtaining a total number of write requests received during the statistic period.

6. The method according to claim 5, wherein determining the candidate AU size comprises:
   in response to the total number of the write requests exceeding a total number threshold, determining an AU size having a maximum matching probability in the predetermined set of AU sizes as the candidate AU size; and in response to the total number of the write requests being less than the total number threshold, determining a default AU size as the candidate AU size.

7. The method according to claim 5, wherein determining the candidate AU size comprises:
in response to a maximum matching probability among the matching probabilities exceeding a matching threshold and a total number of the write requests exceeding a total number threshold, determining an AU size having the maximum matching probability as the candidate AU size; and
in response to the maximum matching probability being less than the matching threshold and/or a total number of the write requests being less than the total number threshold, determining a default AU size as the candidate AU size.

8. The method according to claim 1, further comprising:
in response to the determined candidate AU size being different from a default AU size or a currently used AU size, sending a notification to a user.

9. The method according to claim 1, wherein a length of the statistic period is not less than a predetermined threshold length.

10. The method according to claim 1, further comprising:
writing the candidate AU size into a file index of the new file in the process of creating the new file.

11. A device for file storage, comprising:
processing circuitry, and
at least one memory with computer program codes stored thereon, the processing circuitry being coupled to the at least one memory and configured to execute the computer program codes to cause the device at least to:
determine a candidate allocation unit (AU) size for storing data based on a statistic of an AU size matching with a write request during a statistic period;
obtain the statistic of an AU size matching with a write request by:
determining, for each of write requests received during the statistic period, an AU size matching with the write request from a predetermined set of AU sizes; and
making statistics of a matching probability between each AU size in the predetermined set of AU sizes and the write requests; and
store a new file in persistent storage, wherein the persistent storage comprises a hardware data storage device, by using the determined candidate AU size in a process of creating the new file, wherein the determined candidate AU size is different from a plurality of other AU sizes used for storing other files that are contained in a file system that also contains the new file, whereby utilization of storage space in the persistent storage is improved.

12. The device according to claim 11, wherein the at least one memory and the computer program codes are further configured, with the at least one processor, to cause the device to make statistics of the matching probability between each AU size in the predetermined set of AU sizes and the write requests by:
making statistics of the number of write requests matching with each AU size in the predetermined set of AU sizes, or
making statistics of a ratio between the number of write requests matching with each AU size in the predetermined set of AU sizes and a total number of the write requests.

13. The device according to claim 11, wherein the at least one memory and the computer program codes are further configured, with the at least one processor, to cause the device to determine, for each of write requests received during the statistic period, an AU size matching with the write request from a predetermined set of AU sizes by:
determining, for each of the write requests, a start position and length to be written;
selecting, from the predetermined set of AU sizes, a maximum AU size exactly divisible by both the start position and the length as an AU size matching with the write request.

14. The device according to claim 11, wherein the at least one memory and the computer program codes are further configured, with the at least one processor, to cause the device to determine the candidate AU size by:
in response to a maximum matching probability among the matching probabilities exceeding a matching threshold, determining an AU size having the maximum matching probability as the candidate AU size; and
in response to the maximum matching probability being less than the matching threshold, determining a default AU size as the candidate AU size.

15. The device according to claim 11, wherein the at least one memory and the computer program codes are further configured, with the at least one processor, to cause the device to:
obtain a total number of write requests received during the statistic period.

16. The device according to claim 15, wherein the at least one memory and the computer program codes are further configured, with the at least one processor, to cause the device to determine the candidate AU size by:
in response to a total number of the write requests exceeding a total number threshold, determining an AU size having a maximum matching probability in the predetermined set of AU sizes as the candidate AU size; and
in response to the total number of the write requests being less than a total number threshold, determining a default AU size as the candidate AU size.

17. The device according to claim 15, wherein the at least one memory and the computer program codes are further configured, with the at least one processor, to cause the device to determine the candidate AU size by:
in response to a maximum matching probability among the matching probabilities exceeding a matching threshold and a total number of the write requests exceeding a total number threshold, determining an AU size having the maximum matching probability as the candidate AU size; and
in response to the maximum matching probability being less than the matching threshold and/or a total number of the write requests being less than the total number threshold, determining a default AU size as the candidate AU size.

18. The device according to claim 11, wherein the at least one memory and the computer program codes are further configured, with the at least one processor, to cause the device to:
in response to the determined candidate AU size being different from a default AU size or a currently used AU size, send a notification to a user.

19. The device according to claim 11, wherein the statistic period is periodic, and
the at least one memory and the computer program codes are further configured, with the at least one processor, to cause the device to store the new file by using a candidate AU size determined based on the statistic during the latest statistic period.

20. The device according to claim 11, wherein a length of the statistic period is not smaller than a predetermined threshold length.

21. The device according to claim 11, wherein the at least one memory and the computer program codes are further configured, with the at least one processor, to cause the device to:
write the candidate AU size into a file index of the new file in the process of creating the new file.

22. The device according to claim 11, wherein the at least one memory and the computer program codes are further configured, with the at least one processor, to cause the device to:
detect configuration information from a user; and
in response to the configuration information indicating that an automatic selection function of the AU size in enabled, storing the new file by using the determined candidate AU size.

23. A computer program product having a non-transitory computer readable medium which stores a set of instructions, which, when carried out by the computerized circuitry, cause the computerized circuitry to:
determine a candidate allocation unit (AU) size for storing data based on a statistic of an AU size matching with a write request during a statistic period;
obtain the statistic of the AU size matching with the write request by:
determining, for each of write requests received during the statistic period, an AU size matching with the write request from a predetermined set of AU sizes, and
making statistics of a matching probability between each AU size in the predetermined set of AU sizes and the write requests; and
store a new file in persistent storage, wherein the persistent storage comprises a hardware data storage device, by using the determined candidate AU size in a process of creating the new file, wherein the determined candidate AU size is different from a plurality of other AU sizes used for storing other files that are contained in a file system that also contains the new file, whereby utilization of storage space in the persistent storage is improved.

24. The method according to claim 1, further comprising:
for each one of a plurality of AU sizes in a predetermined set of AU sizes, configuring a corresponding counter to store a probability that the AU size matches the write request.

25. The method according to claim 24, further comprising:
wherein the corresponding counter for each one of the AU sizes in the predetermined set of AU sizes stores a probability that the AU size matches the write request comprising a total number of write requests that have previously been determined to match that AU size.

* * * * *